United States Patent

Bessacini et al.

[11] Patent Number: 5,637,826
[45] Date of Patent: Jun. 10, 1997

[54] METHOD AND APPARATUS FOR OPTIMAL GUIDANCE

[75] Inventors: Anthony F. Bessacini, Narragansett; Robert F. Pinkos, Saunderstown, both of R.I.

[73] Assignee: The United States of America as represented by the Secretary of the Navy, Washington, D.C.

[21] Appl. No.: 605,311

[22] Filed: Feb. 7, 1996

[51] Int. Cl.[6] .......................... G05D 1/12; F42B 19/01; F41G 7/32
[52] U.S. Cl. .................... 114/21.1; 114/21.2; 244/3.11; 244/3.12
[58] Field of Search .................... 114/20.1, 21.1–21.3, 114/23; 244/3.11–3.13

[56] References Cited

U.S. PATENT DOCUMENTS

| | | | |
|---|---|---|---|
| 3,643,616 | 2/1972 | Jones | 114/21.2 |
| 4,750,688 | 6/1988 | Davies | 244/3.11 |
| 5,056,736 | 10/1991 | Barton | 244/3.13 |
| 5,102,065 | 4/1992 | Couderc et al. | 244/3.11 |
| 5,133,520 | 7/1992 | Daly | 244/3.12 |
| 5,310,134 | 5/1994 | Hsu et al. | 244/3.12 |
| 5,319,556 | 6/1994 | Bessacini | 364/424.01 |
| 5,377,164 | 12/1994 | Alstrom et al. | 367/131 |
| 5,379,966 | 1/1995 | Simeone et al. | 244/3.11 |
| 5,436,832 | 7/1995 | Bessacini et al. | 364/424.02 |
| 5,444,669 | 8/1995 | Polvani | 367/96 |

*Primary Examiner*—Michael J. Carone
*Assistant Examiner*—Matthew J. Lattig
*Attorney, Agent, or Firm*—Michael J. McGowan; Prithvi C. Lall; Michael F. Oglo

[57] ABSTRACT

A system for guiding a steerable object, such as a torpedo, from a launch site, such as a submarine, to a contact or target. The system generates two distinct sets of guidance commands. One set is based upon a guidance command model that is selected to be the optimal model for a given tactical situation; the other, for a situation in which a communications path between the launch site and steerable object fails. At the steerable object, an integrity detector determines the integrity of the communications path. A command receptor and storage unit receives the two sets of signals corresponding to the two sets of selected commands. The one set is passed along so long as the communications path has integrity. Otherwise the system defaults and pursues guidance according to the second set of commands.

22 Claims, 2 Drawing Sheets

METHOD AND APPARATUS FOR OPTIMAL GUIDANCE

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION (1) Field of the Invention

This invention generally relates to guidance systems and more specifically to a method and apparatus for guiding an object, such as a submarine torpedo, from a control site, such as a launching submarine, to a remote target or contact.

(2) Description of the Prior Art

Early methods for directing an object toward a contact from a launching site included calculating a fixed trajectory in anticipation of contact maneuvers and then sending the object along that fixed trajectory path. Subsequently there were developed more sophisticated systems for downloading control programs into the steerable object, prior to launch. However, all those methods were characterized by the fact that the launching site lost any control of the steerable object immediately upon launch.

More recent guidance systems for such steerable objects, in both airborne and underwater applications, establish a communications link with the launch site so that systems at the launch site can continuously update the guidance information at the steerable object. In airborne operations this communications path generally includes a radio link between the control site and a missile. Typically control and launch sites are in close proximity so "control site" and "launch site" are used interchangeably in the following discussion.

U.S. Pat. No. 5,310,134 to Hsu et al. discloses a tethered airborne vehicle positioning system comprising a tethered vehicle body having a control system and a propulsion system therein. An optical fiber data link extends from the tethered vehicle control system to a control site. The tethered vehicle system further includes a GPS positioning system and a transmitter that transmits an amplified positioning signal that an optical fiber data link conveys to a receiver at the control site.

It is also known to use an analogous approach for underwater applications. For example, U.S. Pat. No. 3,643,616 to Jones discloses a torpedo guidance system in which a torpedo receives guidance signals for positioning the torpedo to have a substantially constant lead angle with respect to a target by adjusting torpedo speed. A control cable maintains communications until the torpedo is within range of a target or other tactical situations exist that enable the human operator at the firing vessel control to sever the control cable.

The availability of such a control cable as a link between a control site and torpedo has permitted the development of a number of sophisticated systems onboard a submarine that can produce sophisticated control trajectories. For example, U.S. Pat. No. 5,319,556 to Bessacini discloses an adaptive trajectory system apparatus and method. This system uses a plurality of measured or estimated position and motion parameters associated with a contact and contact parameters that include information on quality and alertment status. The contact parameters are compared with an information matrix that defines a plurality of trajectory strategies and implementing data parameters. A trajectory strategy is defined as a candidate trajectory strategy when the required data parameters are included in the measured or estimated contact parameters. An expert system periodically selects a unique possible trajectory strategy based upon a predetermined set of rules that utilize the received contact parameters, quality thereof, contact alertment status and vehicle state information received from the underwater vehicle. The vehicle control commands are generated with a controller using the selected candidate trajectory strategy in the vehicle state information.

This patent discloses three basic trajectories, namely bearing rider, pursuit and target intercept trajectories. A beam rider trajectory is a trajectory established when a reference point on the torpedo remains on the bearing between the control site and the contact. In a pursuit trajectory the heading of the steerable object or torpedo is controlled so as to always point at the contact. In a target intercept trajectory the course of the steerable object is set to intercept the contact or target at some time in the future. One of these trajectories typically will provide optimal results for a given set of tactical conditions.

However, the success of all these systems depends upon the integrity of the communications path including the control cable. By integrity of the communications link it is meant that the communications path faithfully reproduces guidance commands at the steerable object and faithfully reproduces at the control site any signals sent from the steerable object. Although the integrity of this path may fail because of a failure in the electronics, it is more likely that the control link in the path, either the fiber optic or radio link in the airborne applications or the cable in a submarine application, will fail due to interference or severance.

Several solutions have been proposed to overcome this problem. U.S. Pat. No. 5,133,520 to Daly discloses a missile guidance system. A siting and tracking apparatus provides output signals that are transmitted to the missile to control it along a demanded flight path. In the event that the control of the missile by the tracker is lost during flight, adjustment of the computer is immediately stopped and control signals from the model in its existing state of adjustment are employed to direct the continued flight of the missile.

Another solution particularly directed to the severance of submarine cables is disclosed in U.S. Pat. No. 5,377,164 to Almström et al. This patent discloses a method for operating with a wire guided movable vehicle in the form of a reconnaissance and weapon system for underwater use that comprises a vehicle, which may be a torpedo, and a support. A control wire connects the vehicle and the support. This wire has a density lower than that of water so that it tends to float. Providing the cable with buoyancy causes the cable to float above the sea bed and therefore makes the cable less prone to snaring and breakage by snagging sea bed objects.

These solutions, however, do not facilitate the employment of some of the sophisticated trajectory approaches. The use of a last guidance system as disclosed in the Daly patent is only effective if a pursuit trajectory is being used whereby the steerable object path is always pointed at the contact. The remaining trajectories could, at the time of a cable severance, have oriented the torpedo along a path that would, if followed, miss the contact. The use of a buoyant control cable might eliminate some problems. However, a buoyant control cable would not eliminate all the events that can cause control cable severance. Consequently, even though the alternate trajectories are available and may be more optimal than the pursuit trajectory for a given tactical situation, that pursuit trajectory continues to be the solution of choice because it does provide the best option if communications with the torpedo or steerable object are lost.

SUMMARY OF THE INVENTION

Therefore it is an object of this invention to provide an improved method and apparatus for controlling a steerable object over a communications path.

Another object of this invention is to provide an improved method and apparatus for establishing guidance control of a steerable object that compensates for a loss of guidance commands supplied over a communications path.

Still another object of this invention is to provide an improved method and apparatus for providing guidance to a steerable object that provides an optimal trajectory dependent upon the integrity of a communications path.

Yet another object of this invention is to provide an improved method and apparatus for controlling a torpedo from a submarine over a communications path including a control cable.

Yet still another object of this invention is to provide an improved method and apparatus for establishing guidance control of a torpedo from a submarine that compensates for a loss of guidance commands supplied over a communications path including a control cable.

Still yet another object of this invention is to provide an improved method and apparatus for providing guidance to a torpedo that provides an optimal trajectory dependent upon the integrity of a communications path including a control cable.

In accordance with one aspect of this invention, a guidance system at a control site produces first and second independent guidance functions or commands. One is optimized for the existing conditions; the other, for loss of a communications path. Both these guidance commands are transferred over the communications path to the steerable object. A monitor at the steerable object determines the integrity of the communications path and selects, on a mutually exclusive basis, one of the first and second guidance commands for controlling the steerable object dependent upon the monitored integrity of the communications path.

BRIEF DESCRIPTION OF THE DRAWINGS

The various objects, advantages and novel features of this invention will be more fully apparent from a reading of the following detailed description in conjunction with the accompanying drawings in which like reference numerals refer to like parts, and in which.

DESCRIPTION OF THE PREFERRED EMBODIMENT

Figure 1:
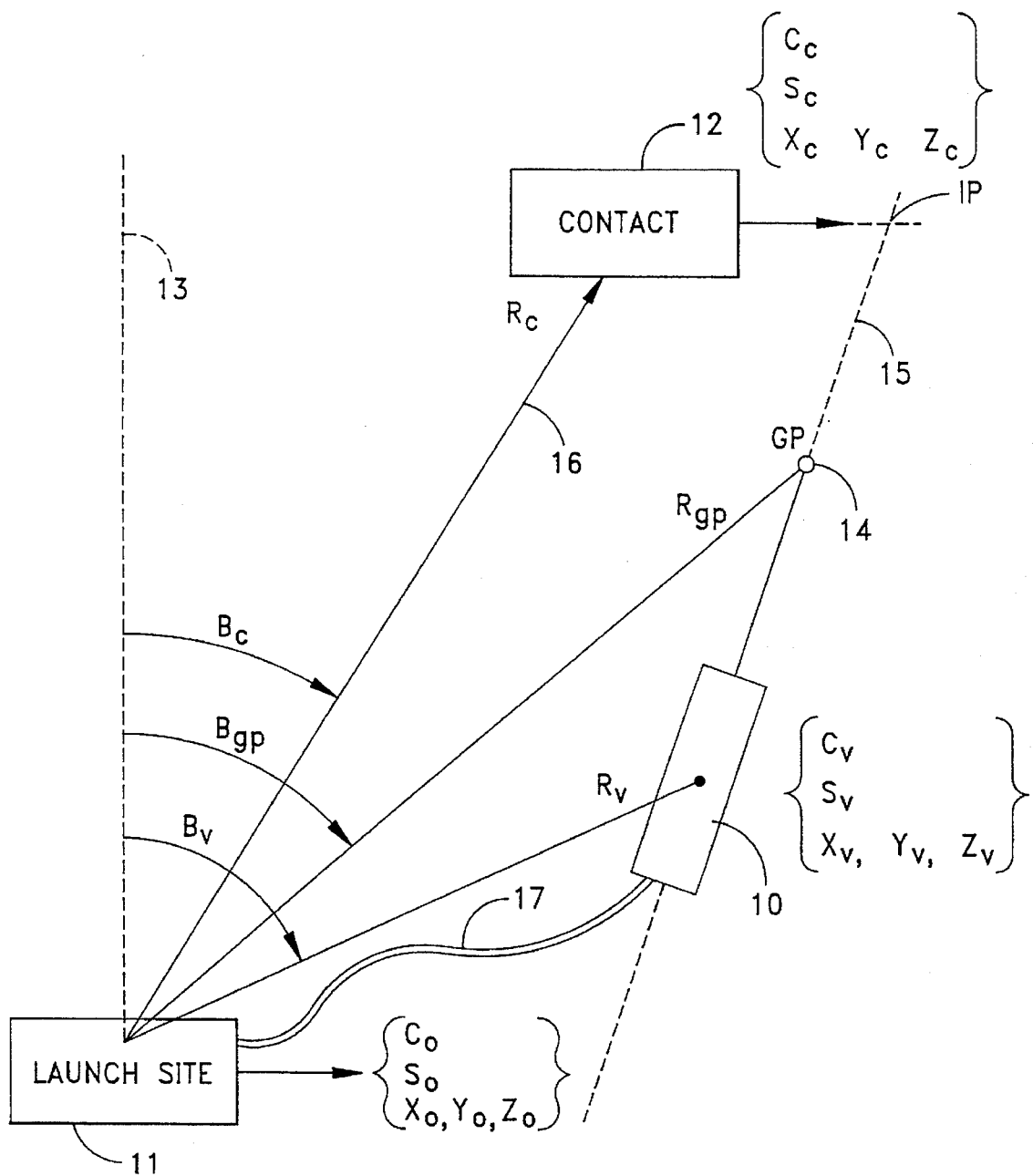
FIG. 1 depicts various instantaneous relationships among a control site, a contact and a steerable object that are useful in understanding this invention.

FIG. 1 depicts an acoustic homing torpedo 10, as an example of a steerable object. The depicted torpedo 10 is assumed to be moving from a first site, shown as a control site or submarine 11 to intercept a second site, shown as a target or contact 12 at an intercept point IP. Each of the torpedo 10, submarine 11 and contact 12 has a "state" defined by its respective course, speed and position. That is, the state of the torpedo 10, or its course, speed and position, is defined by parameters $C_v$, $S_v$, $X_v$, $Y_v$ and $Z_v$ respectively; the state of the control site 11, by parameters $C_0$, $S_0$, $X_0$, $Y_0$ and $Z_0$; and the state of the contact 12, by parameters $C_c$, $S_c$, $X_c$, $Y_c$ and $Z_c$. While the foregoing states fully define the relationships among the torpedo 10, submarine 11 and contact 12, in practice, as known, available measurements do not always enable all these states to be determined, particularly the state of the torpedo 10.

A control system at the launch or control site 11 derives whatever state information or parameters it can from a number of measured parameters. Specifically the launch site 11 uses its own navigation systems for determining its state. When measurements permit, the launch site 11 uses a bearing $B_c$ from a reference line 13, typically north, to the target and a range $R_c$ along a bearing line 16. The launch site can also estimate the course $C_c$ and the speed $S_c$, of the contact 12. Information received from the torpedo 10 determines the bearing $B_v$ and range $R_v$ to the center of the torpedo 10. When the torpedo 10 has an acoustic homing device, a bearing $B_{gp}$ and range $R_{gp}$ to a guidance point 14 is also obtained. The guidance system located at the launch site 11 utilizes the various range and bearing signals for determining the trajectory and forwarding guidance commands to the torpedo 10 over a communications link 17, usually in the form of a communications cable.

Figure 2:
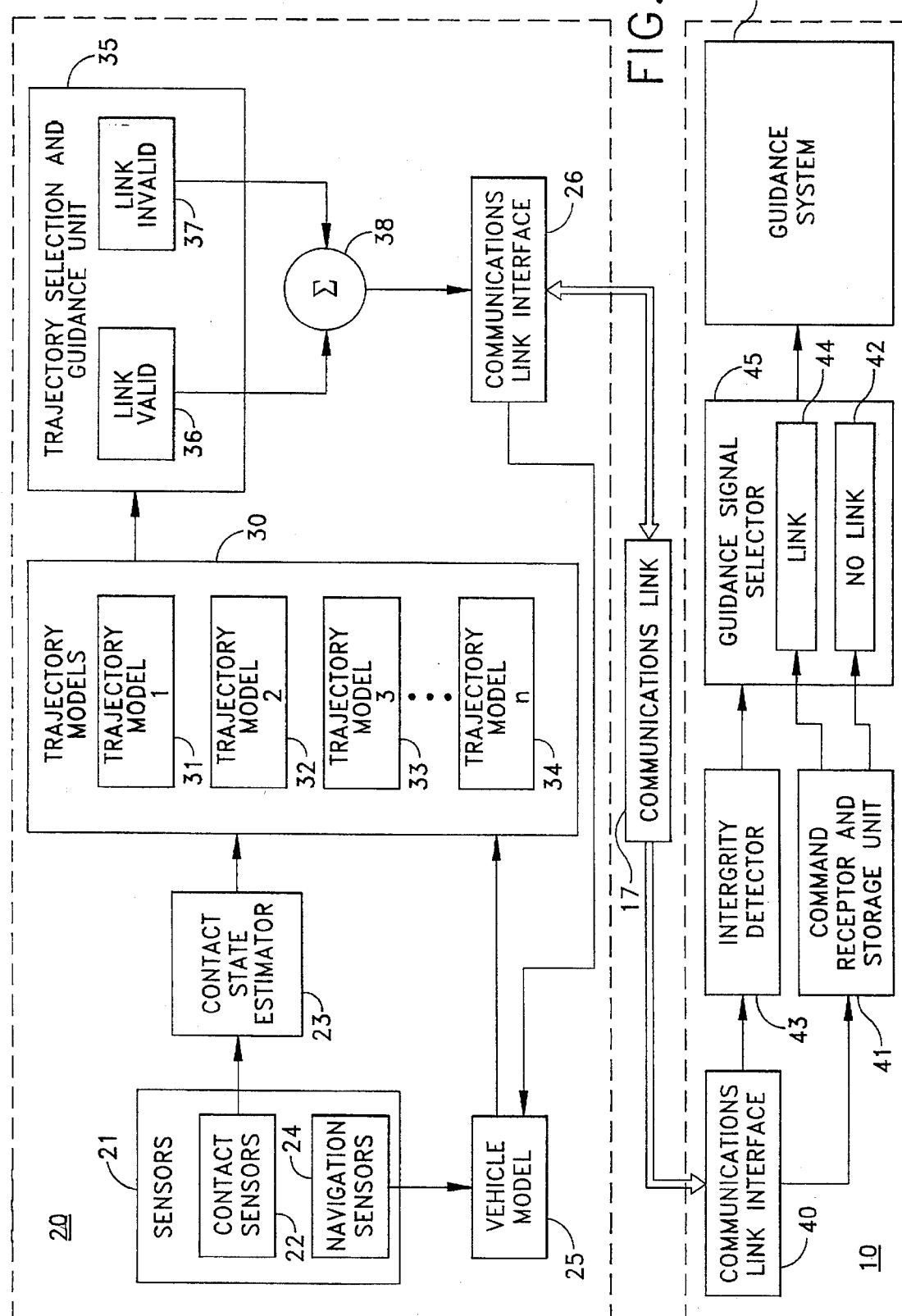
FIG. 2 depicts a system for guiding a steerable object in accordance with this invention.

FIG. 2 depicts the systems at the torpedo 10 and launch site 11 and the interconnecting communications link 17. Referring first to the guidance system 20 at the launch site 11, sensors 21 provide various signals. Specifically, information from contact sensors 22 produce either the bearing or both the bearing and range to the contact 12. The bearing and range signals are the $B_c$ and $R_c$ signals respectively. A contact state estimator 23, as known, uses the signals from the contact sensors to provide one or more estimates of the position, course and speed parameters for the contact state as conditions permit. Navigation sensors 24 provide the launch site position and provide signals representing the state of the launch site into a vehicle model 25. The vehicle model 25 utilizes these signals and signals from the torpedo 10 delivered over the communications link 17 and through a communications link interface 26 to produce signals representing the range and bearing to the torpedo such as the $B_v$, $R_v$, $B_{gp}$ and $R_{gp}$ signals shown in FIG. 1. If it appears that these signals are of adequate quality, they can be used to determine the state of the torpedo 10.

A trajectory model 30 receives the signals from the contact state estimator 23 and the vehicle model 25. The trajectory model 30 can produce guidance commands according to different trajectory models, shown as trajectory models 1 through 3 and n in FIG. 2 and identified by reference numerals 31 through 34 respectively. For example, the trajectory model 31 could be constituted by a beam rider trajectory model. The trajectory models 32 and 33 could be constituted by a target, intercept trajectory model and a pursuit trajectory model, respectively. In accordance with this invention, one model, such as trajectory model n, is constituted by a model that provides an optimum trajectory if the communications link 17 should break.

Essentially the beam rider trajectory model 31, as known, guides the torpedo 10, or its guidance point 14, along the bearing line 16 from the launch site 11 to the contact 12. If the guidance point 14 is being controlled, the guidance commands seek to steer the torpedo 10 so the difference between the signals representing the bearing to the guidance point 14, $B_{gp}$, and the bearing to the contact, $B_c$, are minimized. If a torpedo 10 does not have a guidance point, the guidance commands steer the torpedo 10 so the difference between the signals representing the bearing to the contact 12, $B_c$, and the bearing to the torpedo, $B_y$, is minimized.

The target intercept trajectory model 32 determines a bearing from either the guidance point 14 to the contact 12 or from the torpedo 10 to the contact 12. The guidance system produces guidance commands that cause the torpedo 10 to move along a path 15 such that the bearing from either the guidance point 14 or the torpedo 10 to the contact does not change.

The pursuit trajectory model 33 uses the signals to guide the torpedo 10 so it always points at the contact 12.

The optimal breakage trajectory model 34 produces guidance commands based upon the probabilistic factors that will place the torpedo 10 on the best course to the contact 12 if the communications link 17 breaks.

In the prior art an operator could select between one or the other of these or other models. In accordance with this invention a trajectory selection and guidance unit 35 can select two of the four or more trajectory models for production of first and second guidance commands. Essentially the trajectory selection and guidance unit 35 establishes a LINK VALID path 36 for conveying first guidance commands according to one of the trajectory models that is selected based upon an optimum requirement for a given tactical situation. A LINK INVALID path 37 carries second guidance commands that are produced in response to a preselected trajectory model assuming that the communications path including the communications link 17 will fail.

A combining circuit 38 encodes the LINK VALID commands from the LINK VALID path 36 and LINK INVALID commands from the LINK INVALID path 37 for transfer through the communications link interface 26 onto the communications link 17 as distinct sets of commands. Thus the communications link 17 carries two sets of guidance commands. One is optimized for the tactical situation; the other, for the potential of communications link failure.

At the torpedo 10, a communications link 40 interface receives the encoded commands and routes them to a command receptor and storage unit 41 that translates the two commands back into two distinct sets of guidance signals. The torpedo 10 additionally includes an integrity detector 43. A number of different circuits can implement the integrity detector 43. In one approach the integrity detector 43 monitors a pilot signal in a side band sent over the communications path from the launch site 11. In another the integrity detector 43 monitors the impedance of the communications path, particularly the communications link 17. Whatever the method, the integrity detector 43 produces a LINK signal so long as the integrity detector 43 determines that the communications link interfaces 26 and 40 and communications link 17 have integrity.

A command guidance signal selector 45 receives the LINK signal and the signals from the command receptor and storage unit 41. In a preferred form the signal operates as an astable switch by conveying the LINK INVALID signals corresponding to the LINK INVALID command through a NO LINK path 42 unless the LINK signal is asserted. So long as the integrity detector 43 determines that the communications path is valid, it asserts the LINK signal and enables the LINK path 44 to convey signals corresponding to the LINK VALID commands to the guidance system 46. In essence, the guidance signal selector 45 also operates in a mutually exclusive basis. That is, signals will transfer through either the NO LINK path 42 or the LINK path 44, but not both.

In accordance with this invention, an individual at the launch site 11 can determine two optimal trajectories. A first trajectory is based upon a model that best suits the tactical situation then in existence. The second model is optimized for the event that the communications path, particularly the communications link 17, between the launch site 11 and the torpedo 10 fails. The trajectory selection and guidance unit 35 utilizes these two selected models to produce guidance commands that are sent, via time or division multiplexing or other transmission method, to the torpedo 10 on a continuous basis. The torpedo 10 includes circuitry for demultiplexing or otherwise separating the guidance commands, storing these commands and selecting one or the other on a mutually exclusive basis dependent upon the integrity of the communications link as measured from the torpedo.

This invention has been described with particular reference to an underwater application involving a torpedo 10 and a submarine as a launch site 11. It will also be apparent, however, that this same approach can be utilized in airborne applications where missiles or drones replace the torpedo 10 and a land based site constitutes the launch or control site. In this particular approach the integrity detector 43 would monitor the communications link typically by monitoring interference levels or taking other actions that would assure the integrity of the path. It will also be apparent that under either the underwater or airborne applications alternate trajectory models might be used. Also the specifically disclosed embodiment implements this invention with three trajectory models for selective operation when the communications link 17 is intact and one trajectory model for use when the communications link is broken. Finally either group of trajectory models can comprise more than one specific model; and a specific trajectory model can be a member of both groups. In addition although the trajectory selection and guidance unit 35 and the guidance signal selector 45 in FIG. 2 are shown as establishing particular paths, these are shown for descriptive purposes only. Other equivalent structures or paths might also be established. Therefore it is the object of the appended claims to cover all such variations and modifications as come within the true spirit and scope of this invention.

What is claimed is:

1. A system located at a launching vehicle for controlling the trajectory of a steerable object from the launching vehicle to a contact wherein the system issues commands to the steerable object over a communications path, said system comprising:

generating means at the launching vehicle for producing first and second independent guidance commands;

means for transferring the first and second guidance commands onto the communications path;

guidance means at the steerable object for controlling the trajectory of the steerable object;

storage means at the steerable object for receiving the first and second guidance commands from the communications path;

detector means at the steerable object for monitoring the integrity of the communications path; and means at the steerable object for selecting, on a mutually exclusive basis, one of the first and second guidance commands for transfer to said guidance means as a selected command in response to the detected integrity of the communications path.

2. A system as recited in claim 1 wherein said generating means includes:

a plurality of trajectory models; and trajectory selection and guidance means for selecting among the trajectory models for producing the first and second guidance commands.

3. A system as recited in claim 1 wherein said generating means includes a plurality of trajectory models and trajectory selection and guidance means for selecting a first trajectory model according to a tactical situation and a second trajectory model to be used in case of communications path failure.

4. A system as recited in claim 3 wherein said generating means includes contact sensor means for sensing bearings and ranges from the control site to the contact and means for determining bearings and ranges from the control site to a reference point on the steerable object.

5. A system as recited in claim 4 wherein said generating means additionally includes contact estimation means for estimating at least one of position, course and speed parameters of the contact in response to signals from said contact sensor means.

6. A system as recited in claim 3 wherein the launching vehicle includes means for measuring a bearing to the contact and one of said trajectory models for selection as the first trajectory model is a beam rider trajectory model that establishes a trajectory for the steerable object along the measured bearing line.

7. A system as recited in claim 3 wherein the steerable object is characterized by a predetermined reference point and wherein one of said trajectory models for selection as the first trajectory model is a target intercept trajectory model that establishes a trajectory that maintains a constant bearing from the reference point to the contact.

8. A system as recited in claim 3 wherein one of said trajectory models for selection as the first trajectory model is a contact pursuit trajectory model that guides the steerable object along a trajectory whereby the steerable object always points toward the contact.

9. A system as recited in claim 3 wherein said second trajectory model guides the steerable object along a trajectory to the contact based upon probabilistic factors.

10. A system as recited in claim 1 wherein said selection means at the steerable object includes means for separating the first and second guidance commands and means for conveying the selected one of the separated guidance commands for use in guiding the steerable object.

11. A torpedo for being guided toward a target in response to guidance commands received from a launching vessel over a communications path, said torpedo comprising:

a guidance unit for controlling the trajectory of the torpedo;

a command storage unit for storing first and second independent guidance commands received from the communications path;

a detector for indicating the integrity of the communications path; and a selector connected to said detector for conveying, on a mutually exclusive basis, one of the first and second guidance commands to the guidance unit as a command dependent upon the detected integrity of the communications path.

12. A torpedo as recited in claim 11 wherein said selection means at the steerable object includes means for separating the first and second guidance commands and means for conveying the selected one of the separated guidance commands for use in guiding the steerable object.

13. A method for controlling the trajectory of a steerable object from a delivery site toward a target in response to control signals delivered to the steerable object from the delivery site over a communications path, said method comprising:

generating at the delivery site a first guidance command and a second guidance command;

transferring both the first and second guidance commands over the communications path to the steerable object;

detecting from the steerable object, the integrity of the communications path;

selecting, at the steerable object, one of the first and second guidance commands as a selected command on a mutually exclusive basis as a function of said detection; and using the selected guidance command for guiding the steerable object.

14. A method as recited in claim 13 wherein the system includes a plurality of trajectory models and said generation of the first and second guidance commands includes selecting among the trajectory models for producing the first and second independent guidance commands.

15. A method as recited in claim 13 wherein said generation of the first and second guidance commands includes selecting a first trajectory model according to a tactical situation and a second model to be used in case of communications path failure.

16. A method as recited in claim 15 wherein said generation of the first and second guidance commands includes sensing bearings and ranges from the launching vehicle to the contact and determining bearings and ranges from the launching vehicle to a reference point on the steerable object.

17. A method as recited in claim 16 wherein said generation of the first and second guidance commands includes estimating at least one of position, course and speed parameters of contact state in response to the sensed bearings and ranges.

18. A method as recited in claim 15 additionally comprising the step of measuring the bearing from the launching vehicle to the contact wherein one of said trajectory models for selection as the first trajectory model is a beam rider trajectory model that establishes a trajectory for the steerable object along the measured bearing line.

19. A method as recited in claim 15 wherein the steerable object is characterized by a predetermined reference point and wherein one of said trajectory models for selection as the first trajectory model is a target intercept trajectory model that guides the steerable object along a trajectory that maintains a constant bearing from the reference point to the contact.

20. A method as recited in claim 15 wherein one of said trajectory models for selecting as the first trajectory model is a contact pursuit trajectory model that guides the steerable object along a trajectory whereby the steerable object always points toward the contact.

21. A method as recited in claim 15 wherein the second trajectory model guides the steerable object along a trajectory to the contact based upon probabilistic factors.

22. A method as recited in claim 13 wherein said selection at the steerable object includes separating the first and second guidance commands and conveying the selected one of the separated guidance commands for use in guiding the steerable object.

* * * * *